United States Patent [19]
Hashimoto

[11] Patent Number: 5,243,440
[45] Date of Patent: Sep. 7, 1993

[54] PIXEL DENSITY CONVERSION APPARATUS

[75] Inventor: Yasunori Hashimoto, Yokohama, Japan

[73] Assignee: Canon Kabushiki Kaisha, Tokyo, Japan

[21] Appl. No.: 894,811

[22] Filed: Jun. 5, 1992

[30] Foreign Application Priority Data

Jun. 10, 1991 [JP] Japan .................................. 3-137521

[51] Int. Cl.⁵ ........................ H04N 1/40; H04M 1/393
[52] U.S. Cl. .................................... 358/448; 358/451
[58] Field of Search ............... 358/448, 451, 452, 461, 358/454–455

[56] References Cited

U.S. PATENT DOCUMENTS

| | | |
|---|---|---|
| 4,595,958 | 6/1986 | Anderson, Jr. et al. ............ 358/451 |
| 4,930,021 | 5/1990 | Okada ................................. 358/451 |
| 4,958,237 | 9/1990 | Kubota ............................... 358/451 |
| 5,001,574 | 3/1991 | Shimizu et al. .................... 358/448 |
| 5,128,777 | 7/1992 | Uno .................................... 358/448 |

Primary Examiner—Stephen Brinich
Attorney, Agent, or Firm—Fitzpatrick, Cella, Harper & Scinto

[57] ABSTRACT

A pixel density conversion apparatus of this invention uses linear interpolation in pixel density conversion. Image deterioration caused by the pixel density conversion is suppressed by adding a converted pixel to the position of a non-converted pixel upon execution of equal-magnification processing, and by overlapping a first converted pixel to the midpoint position between the position of a first non-converted pixel and the position of a pixel adjacent thereto.

6 Claims, 12 Drawing Sheets

PIXEL DENSITY CONVERSION APPARATUS

BACKGROUND OF THE INVENTION

The present invention relates to a pixel density conversion apparatus, using a linear interpolation method, for performing variable-magnification processing at an arbitrary magnification.

As a conventional method of converting a pixel density, a so-called SPC method is known. The SPC method is a variable-magnification processing method wherein the value of a non-converted pixel closest to a pixel of interest is determined to be the value of the converted pixel.

However, in the conventional pixel density conversion, image omission is conspicuous in reduction processing, and the smoothness of an image is lost in enlargement processing.

SUMMARY OF THE INVENTION

It is an object of the present invention to prevent image omission in reduction processing and loss of smoothness of an image in enlargement processing in pixel density conversion based on linear interpolation.

In order to achieve the above object, according to the present invention, a pixel density conversion apparatus for performing variable-magnification processing of multi-value image data by linear interpolation, and outputting the multi-value image data, comprises equal-magnification processing means for performing equal-magnification processing by the linear interpolation by overlapping a converted pixel over the position of a non-converted pixel, and variable-magnification processing means for performing variable-magnification processing by the linear interpolation by overlapping a first converted pixel to the midpoint position between the position of a first non-converted pixel and a pixel adjacent thereto.

It is preferable that the variable-magnification processing means performs the variable-magnification processing while defining the distance between adjacent non-converted pixels of the linear interpolation as an integral power of 2.

It is also preferable that the variable-magnification processing means performs pixel density conversion by changing the degree of reduction of sync clocks for output image data.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The preferred embodiment of the present invention will be described in detail hereinafter with reference to the accompanying drawings.

Figure 1:
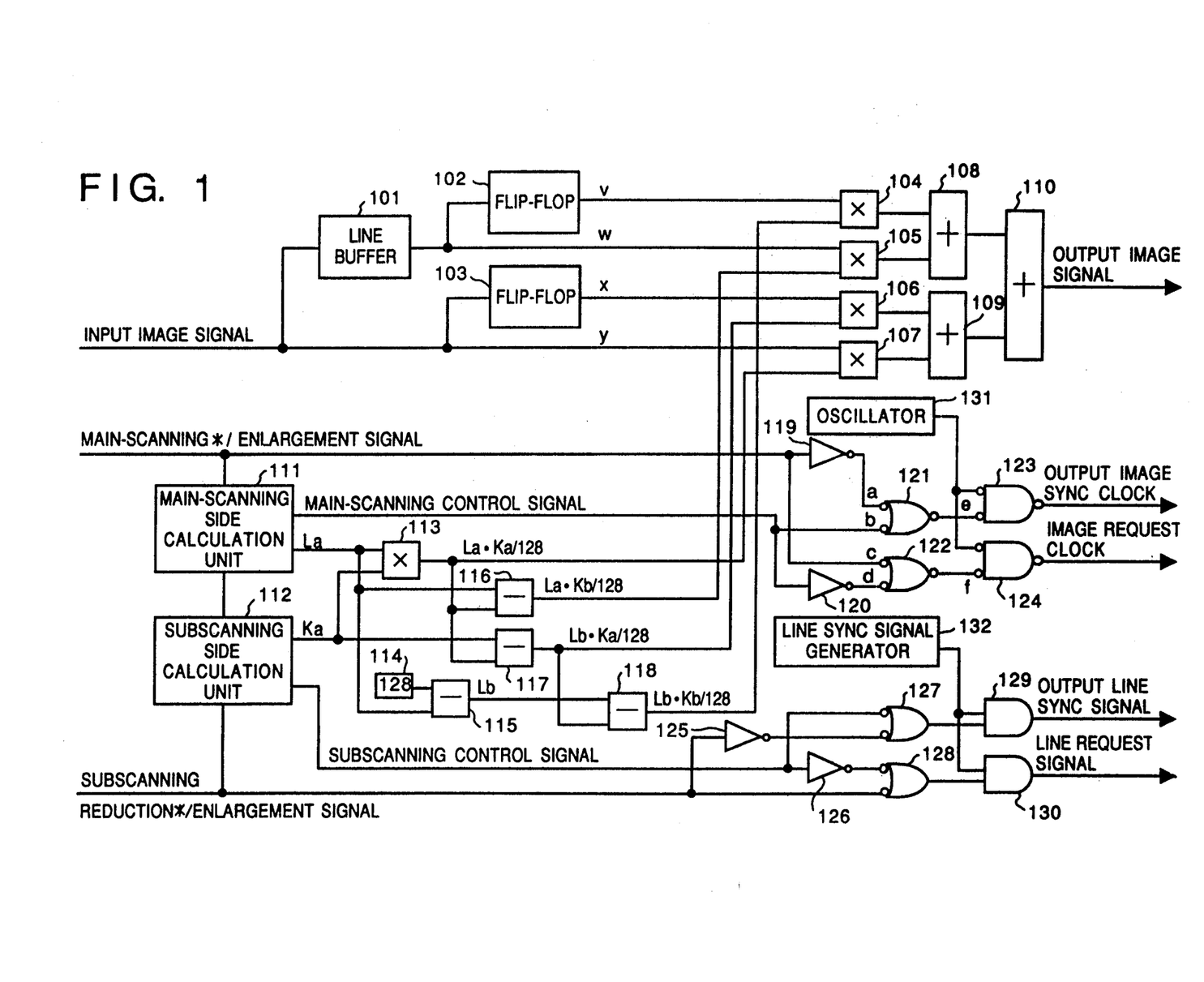
FIG. 1 is a block diagram showing an arrangement of the overall pixel density conversion apparatus according to an embodiment of the present invention.

FIG. 1 is a block diagram showing the arrangement of the overall pixel density conversion apparatus (to be simply referred to as an apparatus hereinafter) according to an embodiment of the present invention. In FIG. 1, an input image signal is delayed by one line by a line buffer 101, and is delayed by one pixel by flip-flops 102 and 103. An oscillator 131 generates an image clock, and a line sync signal generator 132 generates a line sync signal.

In addition, the apparatus of this embodiment comprises multipliers 104 to 107 and 113, adders 108 to 110, a calculation unit 111 for calculating the length of a side in the main-scanning direction, a calculation unit 112 for calculating the length of a side in the subscanning direction, a block 114 for outputting a fixed value (in this case, 128), subtracters 115 to 118, inverters 119, 120, 125, and 126, AND gates 121, 122, 129, and 130, OR gates 123 and 124, and NAND gates 127 and 128. Thus, the apparatus performs predetermined calculation processing to be described later.

Figure 2:
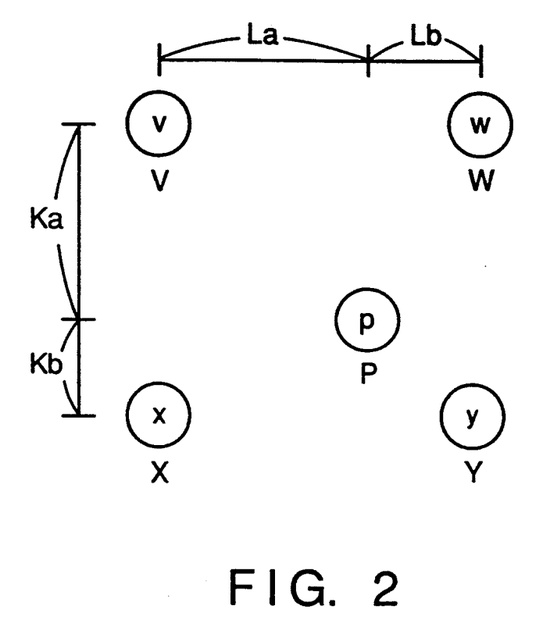
FIG. 2 is a view showing the relationship between a non-converted point and a converted point in a linear interpolation method.

FIG. 2 shows the relationship between points before and after conversion in the linear interpolation method. In FIG. 2, points V, W, X, and Y represent non-converted points. The brightness levels of these points are represented by v, w, x, and y. A converted point is represented by a point P, and the point P and the non-converted points are assumed to have the following positional relationship therebetween. That is, the point P is present at a position separated by La from the point V and separated by Lb from the point W in the main scanning direction (the right-and-left direction in FIG. 2), and is present at a position separated by Ka from the point V and separated by Kb from the point X in the subscanning direction (the up-and-down direction in FIG. 2). In this embodiment, since the length of one side before conversion is assumed to be 128, La+Lb=128, and Ka+Kb=128.

Therefore, a level p of the point P in FIG. 2 is represented by:

$$\frac{v \cdot Lb \cdot Kb + w \cdot La \cdot Kb + x \cdot Lb \cdot Ka + y \cdot La \cdot Ka}{(La + Lb) \cdot (Ka + Kb)}$$

Figure 3:
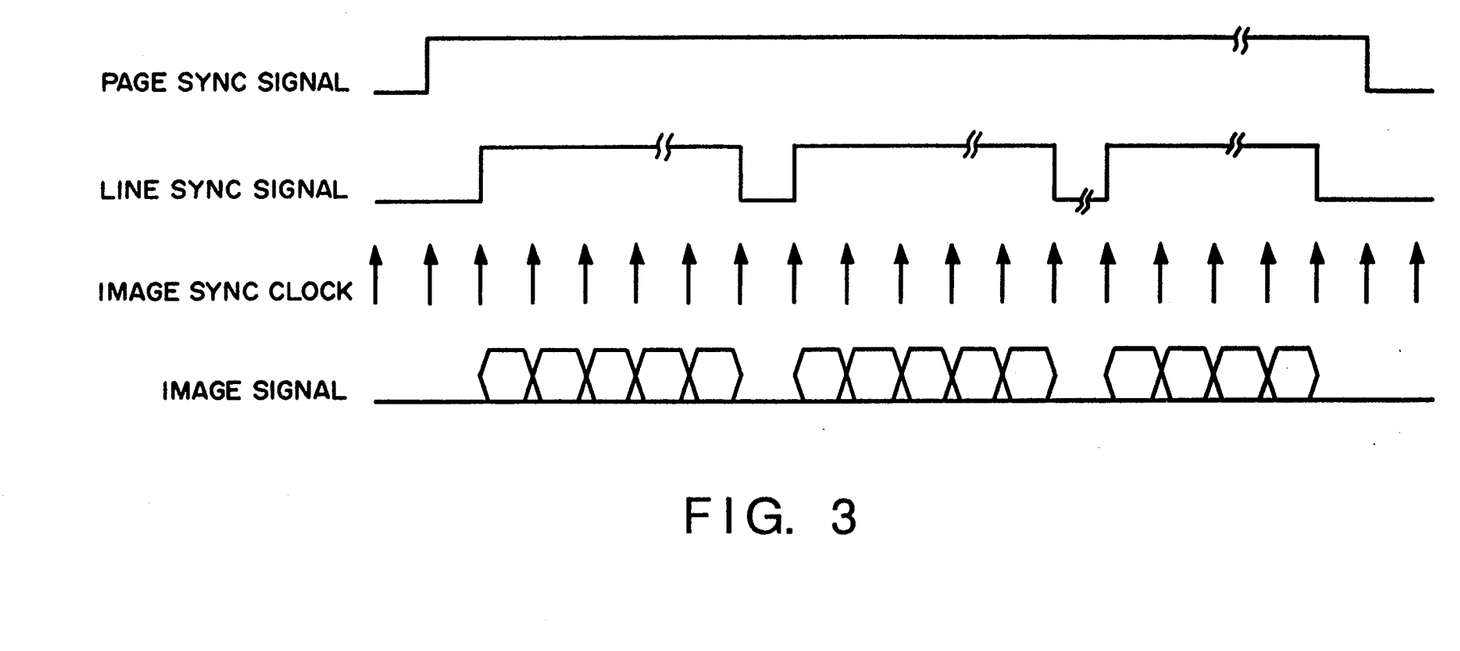
FIG. 3 is a timing chart of image signals processed in the apparatus according to the embodiment.

FIG. 3 is a timing chart of image signals processed in the apparatus of this embodiment. In FIG. 3, a page sync signal is an active-high signal which goes to High level as a logic level during a period wherein an image signal for one page is enabled, and a line sync signal is an active-high signal which goes to High level during a period wherein an image signal for one line is enabled. An image sync clock is a clock output in correspondence with one pixel. The image signal is outputted in synchronism with the leading edge of the image sync clock. Note that the image signal is multi-value data constituted by 8 bits per pixel.

Figure 11:
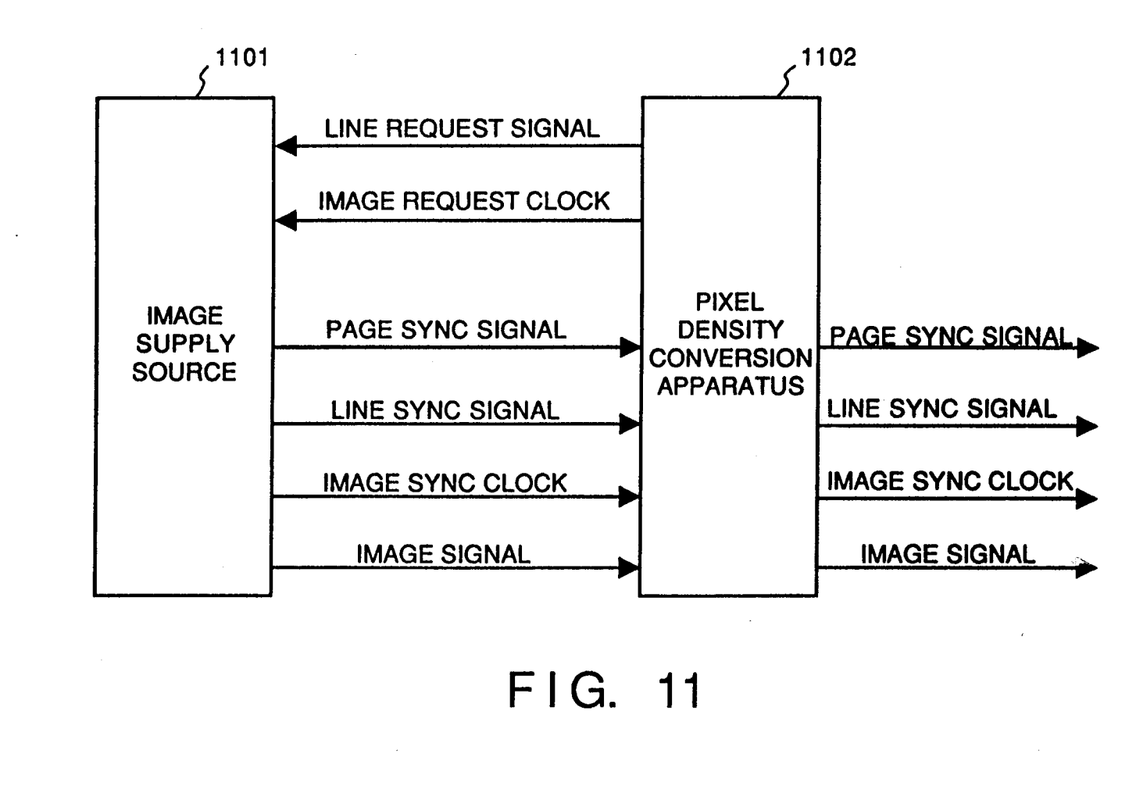
FIG. 11 is a block diagram showing the relationship between the pixel density conversion apparatus according to this embodiment and an image supply source.
Figure 12:
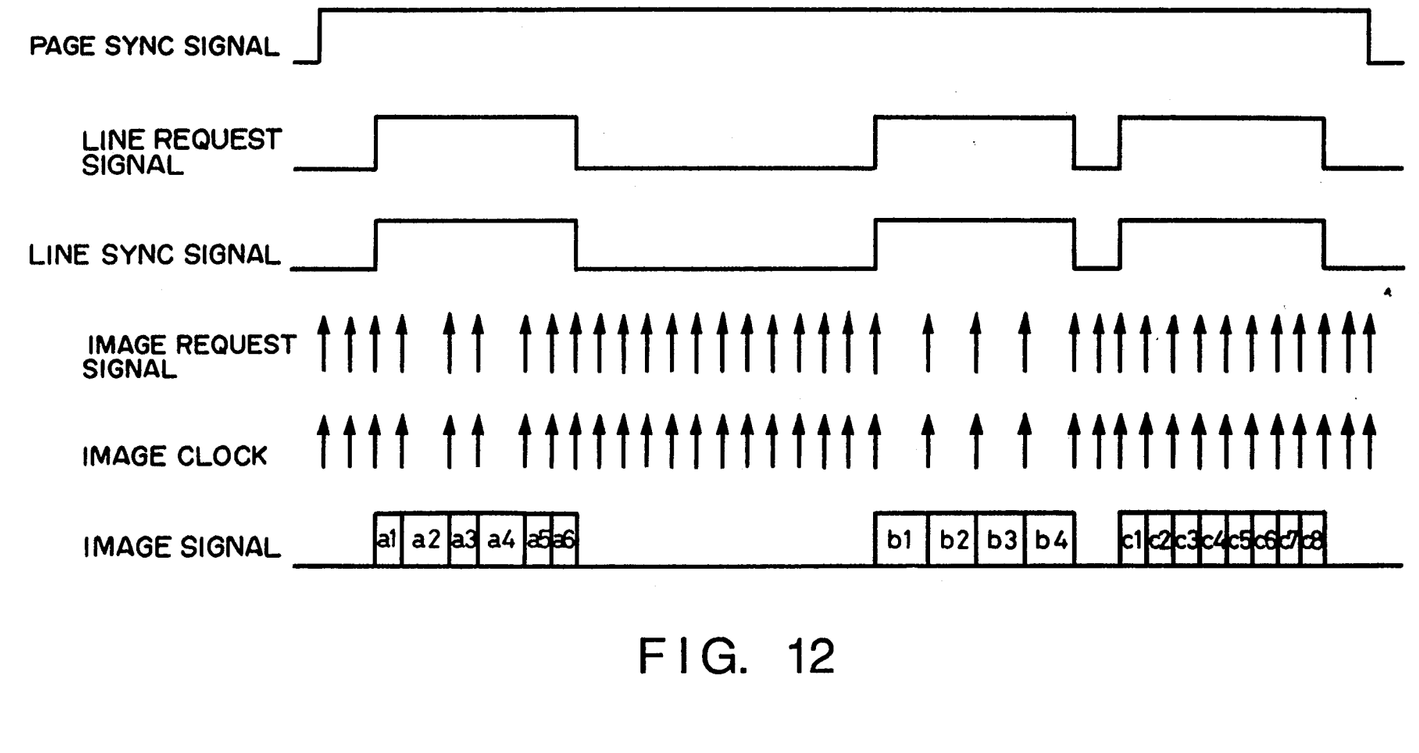
FIG. 12 is a timing chart of signals between the image supply source and the pixel density conversion apparatus.

FIG. 11 is a block diagram showing the relationship between the pixel density conversion apparatus according to this embodiment and an image supply source. FIG. 12 is a timing chart of signals between the image supply source and the pixel density conversion apparatus.

In FIG. 11, signals outputted from an image supply source 1101 are the same as the image signals shown in FIG. 3. A pixel density conversion apparatus 1102 outputs a line request signal and an image request clock to the image supply source. As shown in FIG. 12, when the line request signal is inputted from the pixel density conversion apparatus to the image supply source, the image supply source outputs an image signal. When the image request clock is inputted, the image supply source updates an image signal. More specifically, an image supply can be stopped by controlling the line request signal and the image request clock.

DESCRIPTION OF LEVEL CALCULATION METHOD

The level calculation method in the apparatus according to this embodiment will be described below.

An image signal is inputted in units of lines, as shown in FIG. 3, and is delayed by one line by the line buffer 101 shown in FIG. 1. Pixel data obtained by delaying one-line delayed signal by one pixel by the flip-flop 102 is represented by v, and pixel data which does not go through the flip-flop 102 is represented by w. Pixel data obtained by delaying the input image signal, which is not delayed by one line, by one pixel by the flip-flop 103 is represented by x, and pixel data which does not go through the flip-flop 103 is represented by y. In this manner, four reference points necessary for processing based on the linear interpolation method can be simultaneously referred to.

The main-scanning side calculation unit 111 shown in FIG. 1 has a function of calculating and outputting the above-mentioned La, and a function of outputting a main-scanning control signal as a signal for reducing the image sync clock upon execution of reduction in the main scanning direction, and as a signal for reducing the image request clock to be outputted to the supply source of the image signal upon execution of enlargement in the main scanning direction. The subscanning side calculation unit 112 has a function of calculating and outputting Ka, and a function of outputting a subscanning control signal as a signal for reducing the line sync signals upon execution of reduction in the subscanning direction, and as a signal for reducing the image request signals to be outputted to the supply source of an image signal upon execution of enlargement in the subscanning direction.

The minimum values of both La and Ka are 0, and the maximum values are 80H (H represents hexadecimal notation). In this embodiment, all the internal processing operations are performed in units of 8 bits as the number of calculation bits.

Upon calculation of the level, La·Ka/128, La·Kb/128, Lb·Ka/128, and Lb·Kb/128 must be calculated based on La outputted from the main-scanning side calculation unit 111 and Ka outputted from the subscanning side calculation unit 112. The reason why all the numerators are divided by 128 is as follows. Since the maximum value of the length of the side is 80H, when the maximum values are multiplied with each other, we have 4000H, and the lower 15th bit to 8th bit become effective.

The multiplier 113 multiplies La outputted from the main-scanning side calculation unit 111 with Ka outputted from the subscanning side calculation unit 112, and outputs the lower 15th bit to 8th bit of the product. This value corresponds to La·Ka/128. The subtracter 116 subtracts La·Ka/128 from La to obtain La·Kb/128. This is because La=La·(Ka+Kb)/128.

Similarly, the subtracter 117 subtracts La·Ka/128 from Ka to obtain Lb·Ka/128, and the subtracter 115 subtracts La from 128 to obtain Lb. The subtracter 118 subtracts Lb·Ka/128 from Lb as the output from the subtracter 115 to obtain Lb·Kb/128.

The multiplier 104 multiplies the above-mentioned v with Lb·Kb/128, and outputs the lower 15th bit to 8th bit of the product. This value corresponds to v·Lb·Kb/16,384. The multiplier 105 multiplies w with La·Kb/128, and outputs the lower 15th bit to 8th bit of the product. This value corresponds to w·La·Kb/16,384. Furthermore, the multiplier 106 multiplies x with Lb·Ka/128, and outputs the lower 15th bit to 8th bit of the product. This value corresponds to x·Lb·Ka/16,384. The multiplier 107 multiplies y with La·Ka/128, and outputs the lower 15th bit to 8th bit of the product. This value corresponds to y·La·Ka/16,384.

The adder 108 adds the outputs from the multipliers 104 and 105 to each other, and outputs the lower 9th bit to 2nd bit of the sum. This value corresponds to (v·Lb·Kb+w·La·Kb)/32,768. The adder 109 adds the outputs from the multipliers 106 and 107 to each other, and outputs the lower 9th bit to 2nd bit of the sum. This value corresponds to (x·Lb·Ka+y·La·Ka)/32,768. Furthermore, the adder 110 adds the outputs from the adders 108 and 109, and outputs the lower 9th bit to 2nd bit of the sum. This value corresponds to the level p of the point P, i.e., (v·Lb·Kb+w·La·Kb+x·Lb·Ka+y·La·Ka)/65,536.

DESCRIPTION OF SYNC SIGNAL CONTROL METHOD

The sync signal control method will be described below in the cases of reduction, enlargement, and equal magnification using concrete numerical values.

Figure 4:
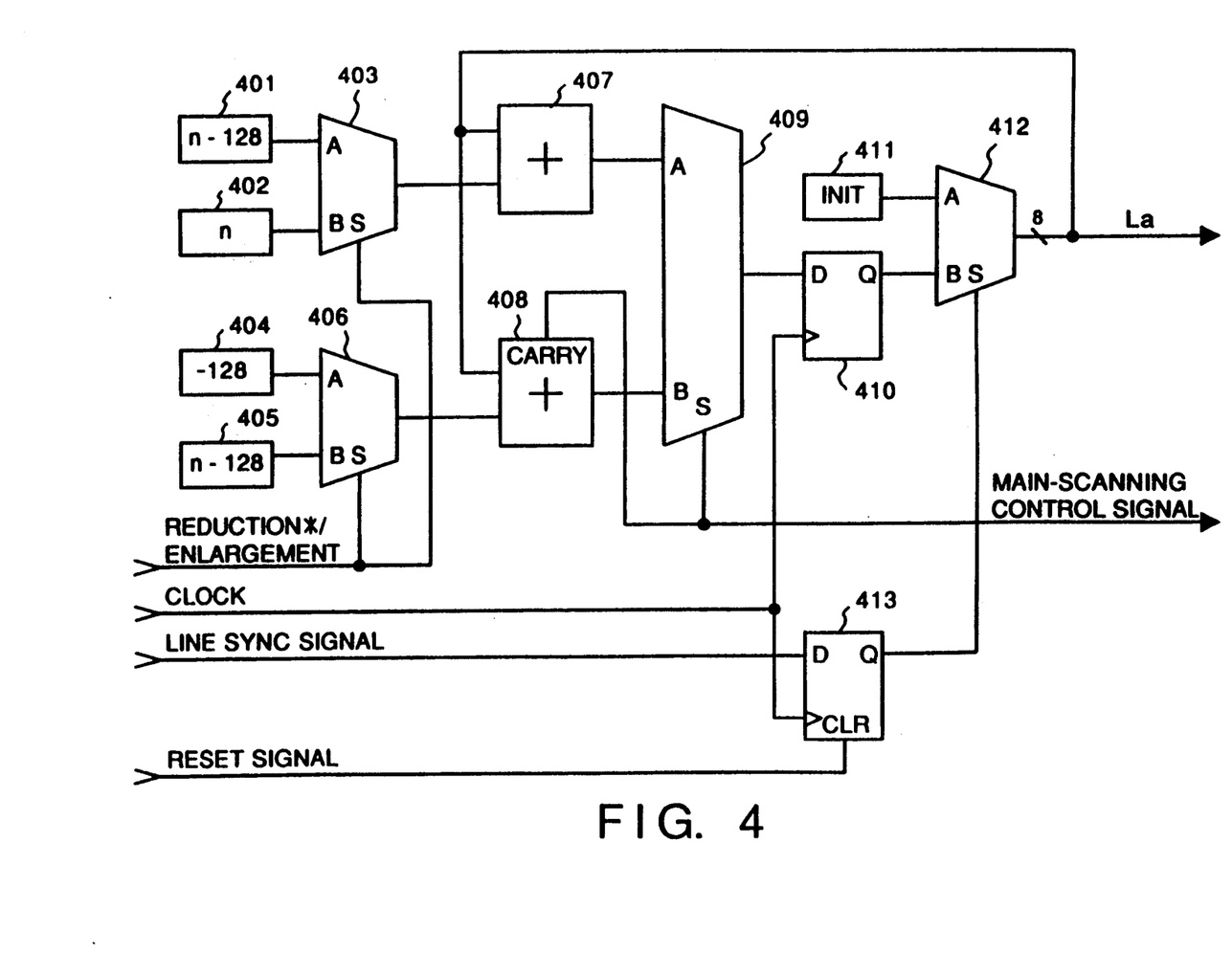
FIG. 4 is a block diagram showing the detailed arrangement of a main-scanning side calculation unit.

FIG. 4 is a block diagram showing the detailed arrangement of the main-scanning side calculation unit 111 shown in FIG. 1. In FIG. 4, outputs from a block 401 having a value "n−128" and a block 402 having a value "n" are inputted to a selector 403. The selector 403 outputs the value of the block 401 when a reduction*/enlargement signal inputted at its S terminal is at logic level Low; outputs the value of the block 402 when it is at level High. A block 404 has a value "−128", and a block 405 has a value "n−128". A selector 406 receives the values of the blocks 404 and 405, and outputs the value of the block 404 when the reduction*/enlargement signal inputted at its S terminal is at logic level Low; outputs the value of the block 405 when it is at High level.

A selector 409 receives the values from adders 407 and 408, and outputs the value of the adder 407 when the carry of the adder 408 is 0; outputs the value of the adder 408 when the carry is 1. The output from the selector 409 is inputted to an 8-bit latch 410. A block 411 has an initial value of the positional relationship between pixels before and after conversion, and the initial value can be rewritten by a CPU (not shown). A selector 412 receives the values from the block 411 and the latch 410. The selector 412 outputs the value of the block 411 when the first pixel data is inputted, and outputs the value of the latch 410 when the second or subsequent pixel data is inputted. A select signal to the selector 412 is generated by delaying the line sync signal by one pixel by a flip-flop 413. Note that the carry signal of the adder 408 is also used in image sync clock control in the reduction processing in the main scanning direction, and image request clock control in the enlargement processing.

In the reduction processing in the main scanning direction, since the reduction*/enlargement signal in the main scanning direction goes to Low level, an input terminal a of the AND gate 121 in FIG. 1 goes to High level. Therefore, the main-scanning control signal outputted from the main-scanning side calculation unit 111 is enabled, and the output image sync clock is controlled by the OR gate 123. When the main-scanning control signal is at Low level, the output image sync clock is outputted; when it is at High level, the clock pulses are reduced. At this time, since an input terminal c of the AND gate 122 is at Low level, an input terminal f of the OR gate 124 also goes to Low level, and the image request clock is always outputted.

When the enlargement processing in the main scanning direction is performed, the reduction*/enlargement signal in the main scanning direction goes to High level, and the input terminal c of the AND gate 122 also goes to High level. Therefore, the main-scanning control signal is enabled, and the image request clock is controlled by the OR gate 124. Therefore, when the main scanning control signal is at High level, the image request clock is outputted; when it is at Low level, the clock pulses are reduced. At this time, the input terminal e of the AND gate 121 goes to Low level, and an input terminal e of the OR gate 123 is kept at Low level. Therefore, the output image sync clock is always outputted.

Since processing in the subscanning direction is the same as that in the main scanning direction, a detailed description thereof will be omitted here.

Figure 5:
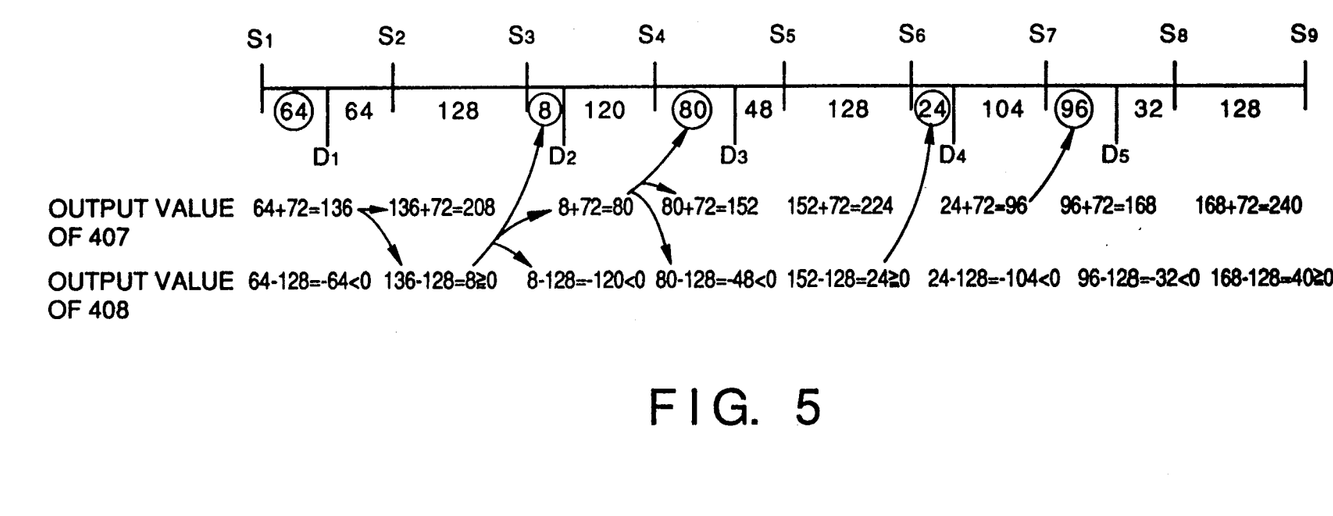
FIG. 5 is a view showing the positional relationship of pixels before and after conversion in 64% reduction processing.
Figure 6:
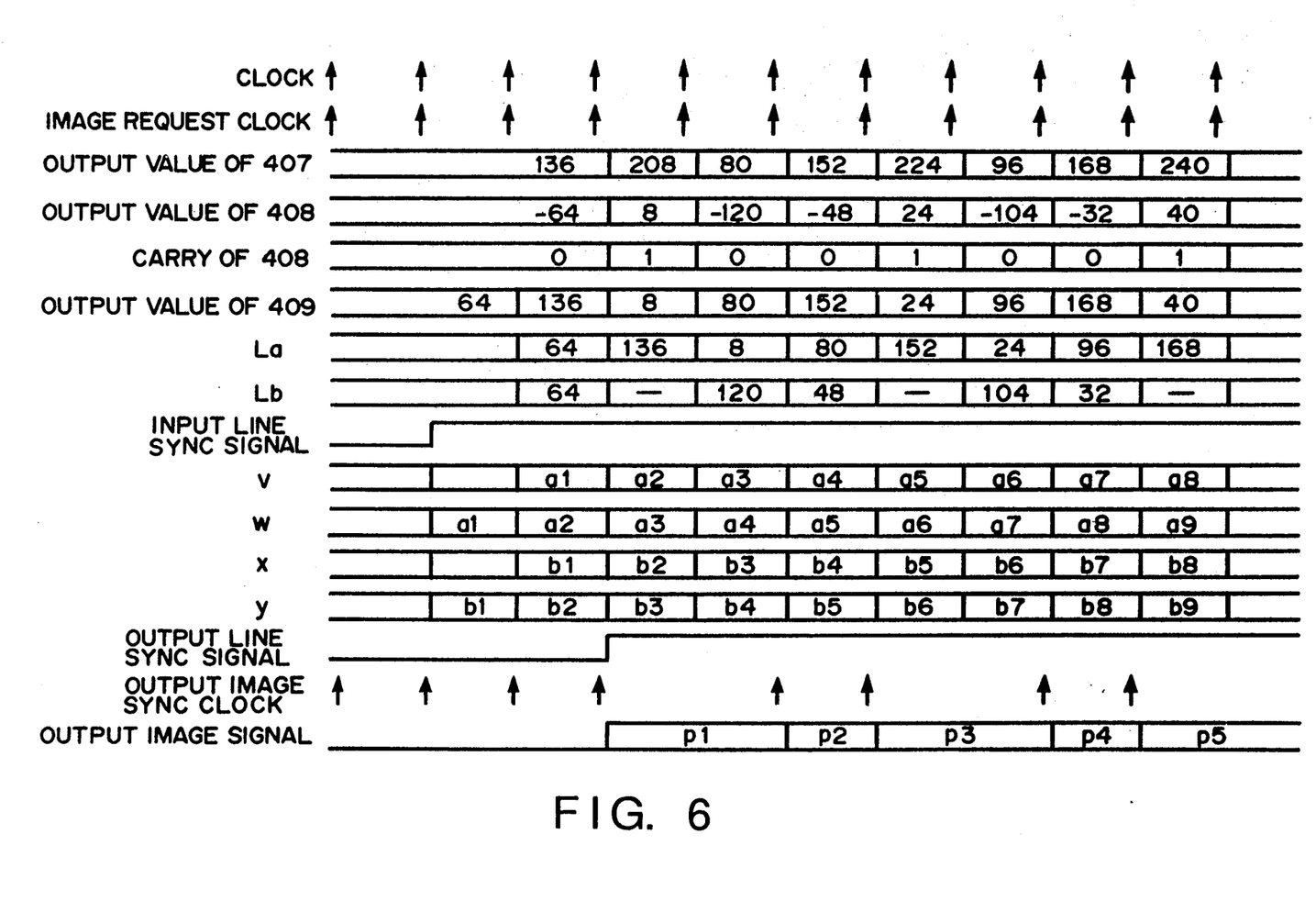
FIG. 6 is a timing chart when 64% reduction processing is performed.

The operation of the main-scanning side calculation unit 111 will be described below using concrete numerical values. FIG. 5 shows the length of the side when ×128/200 (64%) reduction processing is performed. In FIG. 5, S1, S2, S3, . . . represent reference non-converted pixels, and D1, D2, D3, . . . represent converted pixels. FIG. 6 is a timing chart when the ×128/200 reduction processing is performed.

In FIG. 6, a clock is the fundamental operation clock generated by the oscillator 131 shown in FIG. 1. The image request clock is a clock to be outputted to the image supply source, and the image supply source outputs an image signal in synchronism with this clock. An output value of 407 is the output value of the adder 407 in FIG. 4 showing the internal arrangement of the main-scanning side calculation unit 111 shown in FIG. 1. An output value of 408 and a carry of 408 are also the output values of the adder 408.

As described above, La is the calculation result of the length of the side of the main-scanning side calculation unit 111 shown in FIG. 1, and Lb is the output value of the subtracter 115. The input line sync signal is a line sync signal inputted to the pixel density conversion apparatus from the image supply source. v, w, x, and y respectively represent reference pixels, 1, 2, 3, . . . represent numbers assigned to pixels in the main scanning direction in turn, and a, b, . . . represent the order of lines. The output line sync signal, the output image sync clock, and the output image signal are image signals outputted from the pixel density conversion apparatus.

DESCRIPTION OF REDUCTION PROCESSING

When the reduction processing is performed, the reduction*/enlargement signal in FIG. 4 goes to Low level, as described above, and the selector 403 selects the value of the block 401. The block 401 has a value "n−128". In this case, since n=200, the value of the block 401 is 72. The selector 406 selects the value of the block 404, and this block has a fixed value "−128".

The value of the block 411 having the initial value of the side is 64 in this case. Initially, since the selector 412 selects the value of the block 411, the calculation result of the adder 407 is 64+72=136, and the calculation result of the adder 408 is 64−128 = −64<0. Thus, the carry of the adder 408 becomes 0. Therefore, La=64 is outputted. The selector 409 selects the value of the adder 407, i.e., 136. The latch 410 fetches this value at the timing of the leading edge of the image sync clock, and its output value is 136.

The selector 412 then selects the value of the latch 410, the calculation result of the adder 407 is 136+72=208, and the calculation result of the adder 408 is 136−128=8≧0. Thus, the carry of the adder 408 becomes 1. At this time, the output image sync clocks are reduced by gating. The selector 409 selects 8 as the value of the adder 408, and the latch 410 fetches this value in response to the leading edge of the image sync clock. Thus, the output value of the latch 410 is 8.

Since the calculation result of the adder 407 is 8 +72=80, and the calculation result of the adder 408 is 8−128=−120<0, the carry of the adder 408 becomes 0. Therefore, La=8 is outputted. The selector 409 selects the value "80" of the adder 407, and the latch 412 fetches this value. Thereafter, the value of the side is similarly calculated, as shown in FIG. 5.

DESCRIPTION OF ENLARGEMENT PROCESSING

Figure 7:
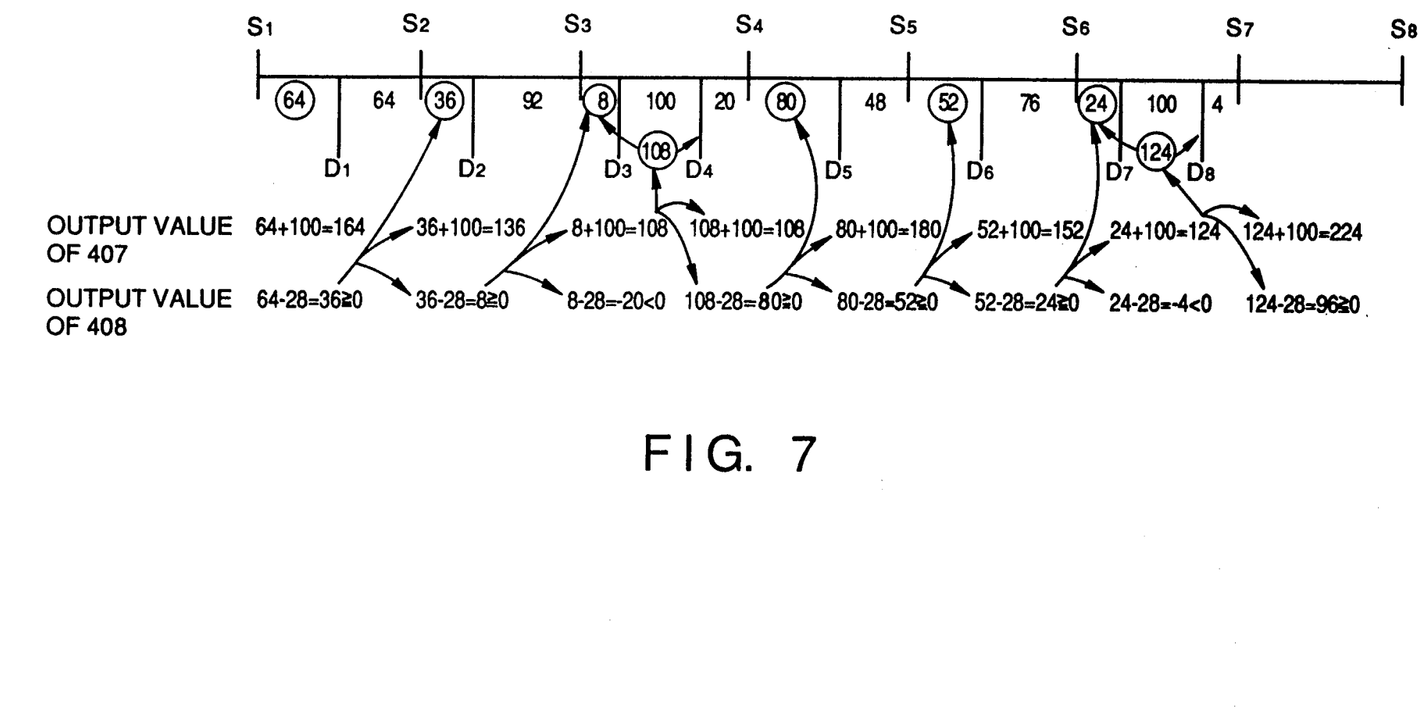
FIG. 7 is a view showing the positional relationship of pixels before and after conversion in 128% enlargement processing.

FIG. 7 shows the length of the side when ×128/100 (128%) enlargement processing is performed. Note that symbols in FIG. 7 have the same meanings as those in FIG. 5.

Figure 8:
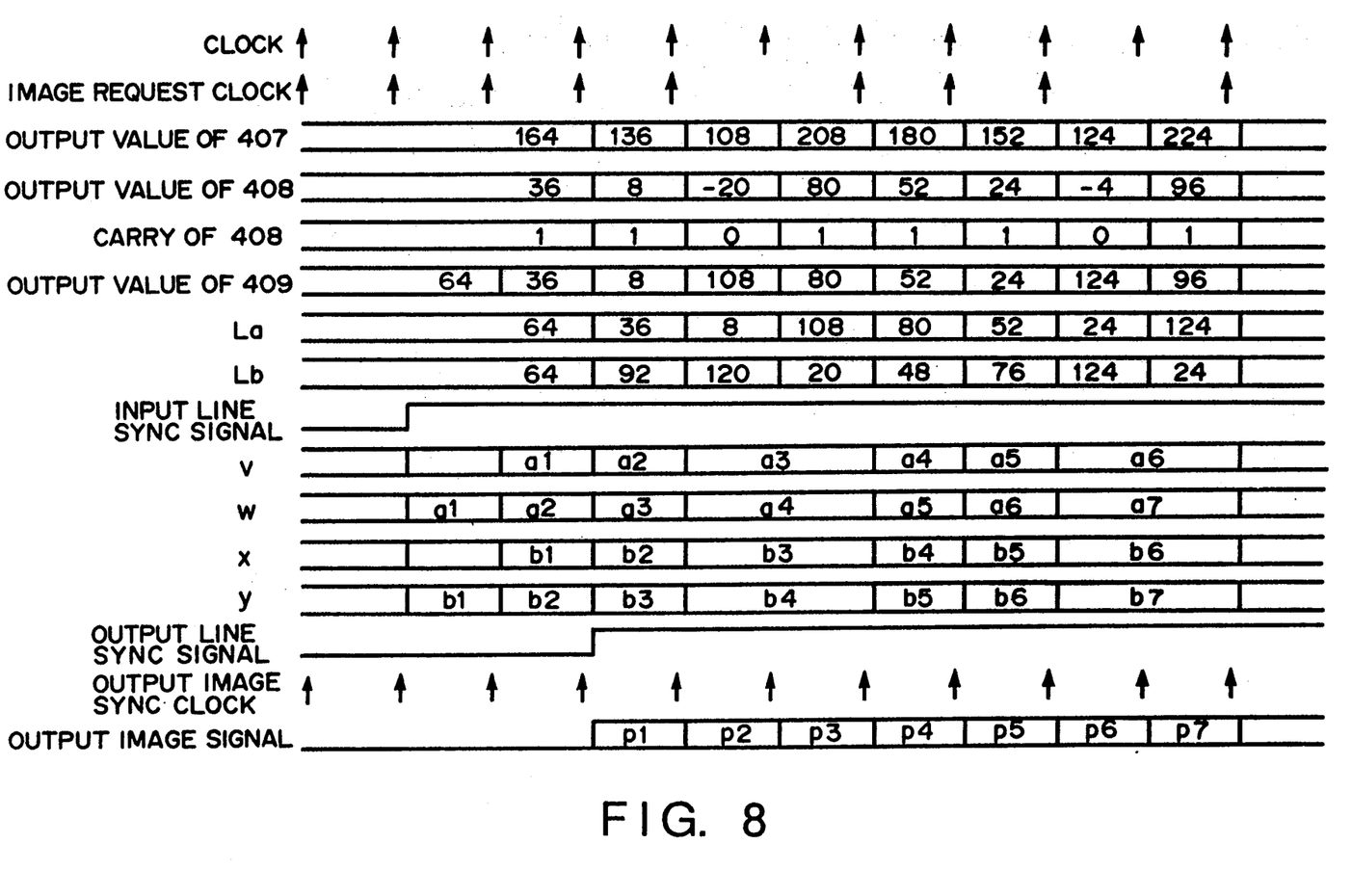
FIG. 8 is a timing chart when 128% enlargement processing is performed.

FIG. 8 is a timing chart when the ×128/100 enlargement processing is performed. Since the signals shown in FIG. 8 are the same as those in FIG. 6, a detailed description thereof will be omitted.

As described above, in the enlargement processing, the reduction*/enlargement signal shown in FIG. 4 goes to High level, and the selector 403 selects the value of the block 402. The block 402 has a value "n". In this case, since n=100, the output value of the selector 403 is 100. The selector 406 selects the value of the block 405. Since the block 405 has a value "n−128", when n=100, the value of the block 405 is 100−128=−28.

When the initial value of the side of the block 411 is assumed to be 64, since the selector 412 initially selects the value of the block 411, the calculation result of the adder 407 is 64+100=164, and the calculation result of the adder 408 is 64−28=36≧0. Thus, the carry of the adder 408 becomes 1. Therefore, the image request clock is outputted to the image supply source to update the next reference pixel. The length of the side is outputted as La=64. The selector 409 selects the value "36" of the adder 408, and the latch 410 fetches this value in response to the leading edge of the image sync clock. Thus, the output value of the latch 410 is 36.

Since the selector 412 selects the value of the latch 410, the calculation result of the adder 407 is 36+100=136, and the calculation result of the adder 408 is 36−28=8≧0. Thus, the carry of the adder 408 becomes 1. Therefore, the image request clock is outputted to update the next reference pixel. The length of the side is outputted as La=36. The selector 409 selects the value "8" of the adder 408, and the latch 410 fetches this value at the timing of the leading edge of the image sync clock. Thus, the output value of the latch 410 is 8.

Since the calculation result of the adder 407 is 8+100=108, and the calculation result of the adder 408 is 8−28=−20<0, the carry of the adder 408 becomes 0. Therefore, the image request clock pulses are reduced not to update the next reference pixel. The length of the side is outputted as La=8. The selector 409 selects the value "108" of the adder 407, and the latch 410 fetches this value. Thereafter, the value of the side is similarly calculated, as shown in FIG. 7.

As described above, the calculation processing of the length of the side in the main scanning direction is performed.

Note that the subscanning side calculation unit for performing calculation processing of the side in the subscanning direction has the same arrangement as that of the main-scanning side calculation unit, and the calculation method is substantially the same as that of the main-scanning side calculation unit. Therefore, one pulse per line is used in place of the clock input to the latch 410. When reduction processing in the subscanning direction is performed, the carry signal of the adder 408 is used as a gate signal for the line sync signal. When enlargement processing is performed, the carry signal of the adder 408 is used as a gate signal for the line request signal to be inputted to the image supply source. The calculation method in the subscanning direction can be explained by replacing the reference pixels with reference lines. The levels of output pixels are calculated based on the reference pixel levels and the area of a rectangle defined by pixels before and after conversion.

DESCRIPTION OF EQUAL-MAGNIFICATION PROCESSING

Figure 9:
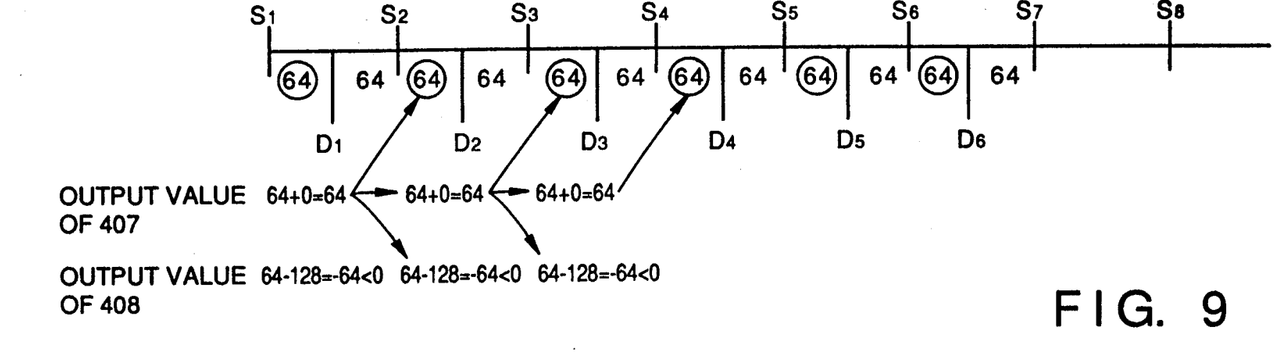
FIG. 9 is a view showing the positional relationship of pixels before and after conversion when equal-magnification processing is performed based on a calculation method of the reduction processing.
Figure 10:
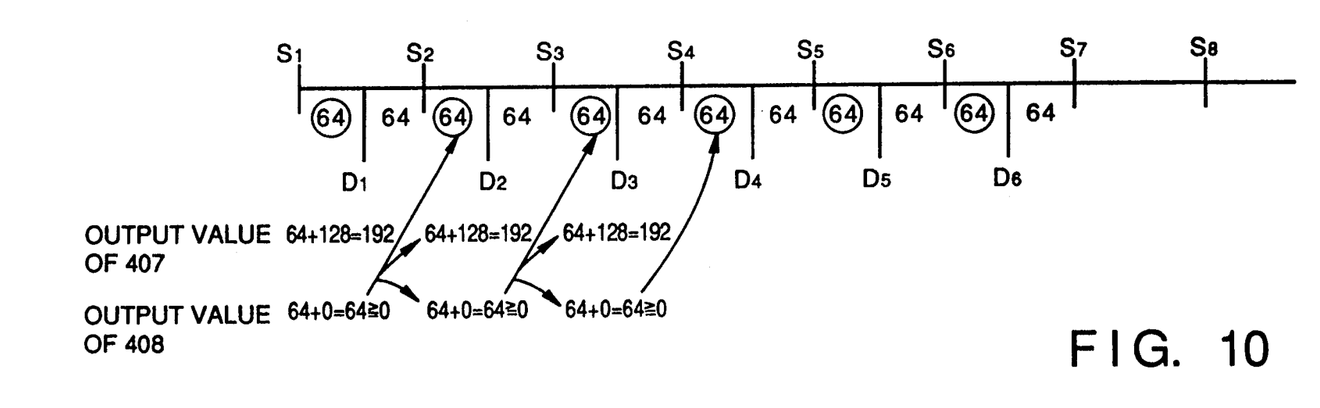
FIG. 10 is a view showing the positional relationship of pixels before and after conversion when equal-magnification processing is performed by the same processing as the enlargement processing.

FIG. 9 is a view showing a case wherein equal-magnification processing is performed by the calculation method of the reduction processing, and FIG. 10 is a view showing a case wherein equal-magnification processing is performed by the calculation method of the enlargement processing.

FIG. 9 shows the length of the side when ×128/128 (100%) reduction processing is performed. In this case, since the reduction processing is performed, the reduction*/enlargement signal shown in FIG. 4 goes to Low level, as described above, the selector 403 selects the value of the block 401. The block 401 has a value "n−128". In this case, since n=128, the selector 403 selects a value "0". The selector 406 selects the value of the block 404. This block has a fixed value "−128".

The value of the block 411 having the initial value of the side is 64. Initially, since the selector 412 selects the value of the block 411, the calculation result of the adder 407 is 64+0=64, and the calculation result of the adder 408 is 64−128=−64 <0. Thus, the carry of the adder 408 becomes 0. Therefore, La=64 is outputted. The selector 409 selects the value "64" of the adder 407, and the latch 410 fetches this value at the timing of the leading edge of the image sync clock. Thus, the output value of the latch 410 is 64.

Since the selector 412 selects the value of the latch 410, the calculation result of the adder 407 is 64+0=64, and the calculation result of the adder 408 is 64−128=−64<0. Thus, the carry of the adder 408 becomes 0. Therefore, La=64 is outputted. The selector 409 selects the value "64" of the adder 407, and the latch 410 fetches this value at the timing of the leading edge of the image sync clock. Thus, the output value of the latch 410 is 64. Thereafter, the value of the side is similarly calculated. La always becomes 64, and the carry of the adder 408 always becomes 0. Therefore, the output clock is always outputted. In this manner, the equal-magnification processing can be performed using the calculation method of the reduction processing.

A case will be described below wherein equal-magnification processing is performed using the calculation method of the enlargement processing.

FIG. 10 shows the length of the side when ×128/128 (100%) enlargement processing is performed. As described above, when the enlargement processing is performed, the reduction*/enlargement signal shown in FIG. 4 goes to High level, and the selector 403 selects the value of the block 402. This block 402 has a value "n". In this case, since n=128, the output value of the selector 403 is 128. The selector 406 selects the value of the block 405. The block 405 has a value "n−128". Since n=128, the selector 406 selects a value "128−128=0".

When the initial value of the side of the block 411 is assumed to be 64, since the selector 412 initially selects the value of the block 411, the calculation result of the adder 407 is 64+128=192, and the calculation result of the adder 408 is 64+0=64≧0. Thus, the carry of the adder 408 becomes 1. Therefore, the image request clock is outputted to the image supply source to update the next reference pixel. The length of the side is outputted as La=64.

The selector 409 selects 64 as the value of the adder 408, and the latch 410 fetches this value in response to the leading edge of the image sync clock. Thus, the output value of the latch 410 is 64. Since the selector 412 then selects the value of the latch 410, the calculation result of the adder 407 is 64+128 =192, and the calculation result of the adder 408 is 64 +0=64≧0. Thus, the carry of the adder 408 becomes 1. Therefore, the image request clock is outputted to update the next reference pixel. The length of the side is outputted as La=64.

The selector 409 selects the value "64" of the adder 408, and the latch 410 fetches this value at the timing of the leading edge of the image sync clock. Thus, the output value of the latch 410 is 64. Thereafter, the value of the side is similarly calculated. La always becomes 64, and the carry of the adder 408 always becomes 1. Therefore, the image request clock is always outputted. In this manner, the equal-magnification processing can be performed using the calculation method of the enlargement processing.

Since the linear interpolation method is used in pixel density conversion, and the pixel density is converted by changing the degree of reduction of the image sync clocks to be outputted, image quality deterioration caused by conversion can be suppressed, and reduction processing, enlargement processing, and equal-magnification processing can be performed by a single circuit. For this reason, the circuit scale for these processing operations can be reduced.

Since the distance between adjacent non-converted pixels is given by an integral power of 2, division processing can be realized by bit-shift operations. Thus, no divider is required, and a processing circuit can be rendered compact.

Furthermore, in the equal-magnification processing, a non-converted image is directly outputted, and in variable-magnification processing, a first converted pixel is overlapped to the midpoint position between the position of a first non-converted pixel and the position of a pixel adjacent thereto to increase the number of non-converted pixels to be referred to as converted pixels, thereby suppressing image deterioration in equal-magnification processing, and image deterioration such as image omission in variable-magnification processing.

MODIFICATION

A modification according to the embodiment of the present invention will be described below.

In the above embodiment, the output value from the block 411 shown in FIG. 4, i.e., the block having the initial value of the positional relationship between pixels before and after conversion, has been described as a fixed value "64". Alternatively, this value may be changed according to a variable magnification.

Figure 13:
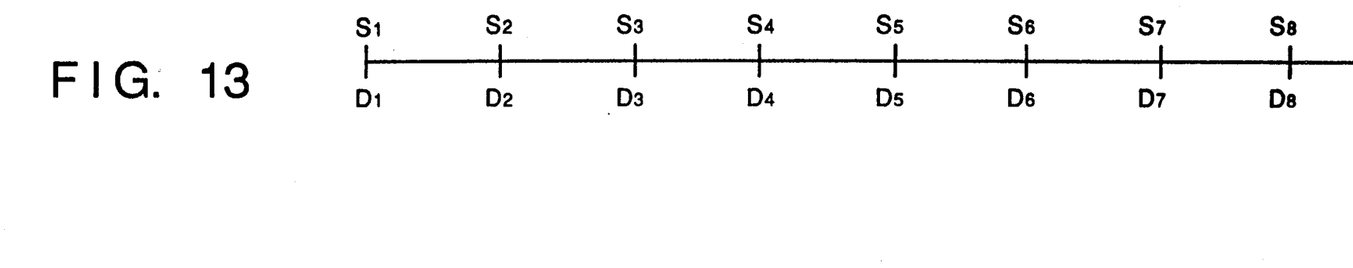
FIG. 13 is a view showing the correspondence between input and output images at an equal magnification according to a modification.

FIG. 13 shows the correspondence between input and output images at an equal magnification. In FIG. 13, the initial value is 0. As can be seen from FIG. 13, when the initial value is set to be 0, images before and after conversion coincide with each other, and the image before conversion can be directly outputted.

Figure 14:
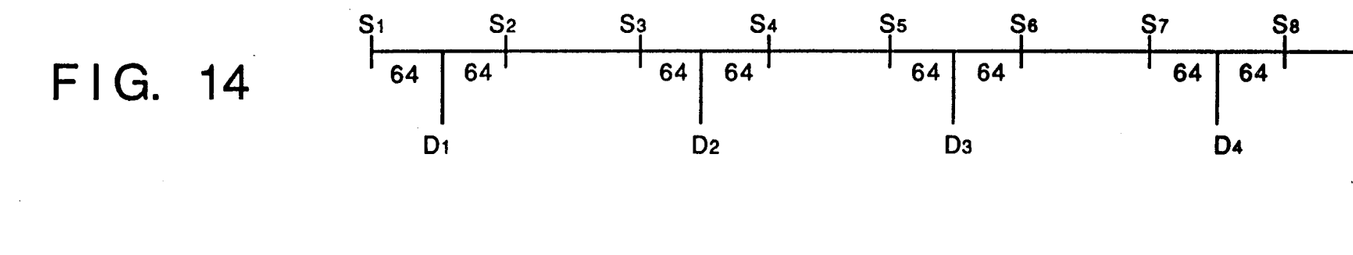
FIG. 14 is a view showing the correspondence between input and output images at a $\times \frac{1}{2}$ magnification (initial value=64) according to the modification.
Figure 15:
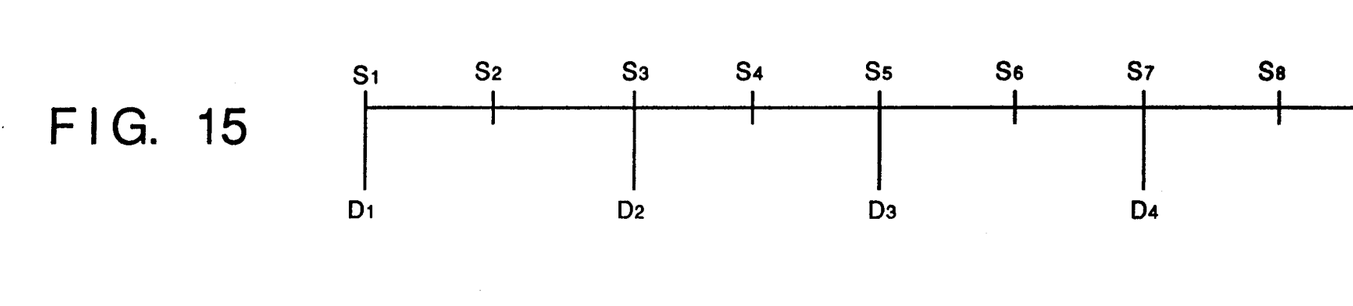
FIG. 15 is a view showing the correspondence between input and output images at a $\times \frac{1}{2}$ magnification (initial value=0) according to the modification.

FIG. 14 shows the correspondence between input and output images at a ×½ magnification. In this case, the initial value is 64. In this case, for example, D1 is calculated from S1 and S2, and D2 is calculated from S3 and S4. FIG. 15 also shows the correspondence between input and output images at a ×½ magnification. In FIG. 15, the initial value is 0. In this case, for example, D1 has the same value as S1, and D2 has the same value as S3.

In this manner, at the equal magnification, the initial value is set to be 0, as shown in FIG. 13, and at the ×½ magnification, the initial value is set to be 64, i.e., the length ½ the distance between adjacent non-converted pixels is set, as shown in FIG. 14. In FIG. 15, processing equivalent to the SPC method is performed. At other magnifications, the initial value is set to be a length ½ the distance between adjacent non-converted pixels.

As many apparently widely different embodiments of the present invention can be made without departing from the spirit and scope thereof, it is to be understood that the invention is not limited to the specific embodiments thereof except as defined in the appended claims.

What is claimed is:

1. A pixel density conversion apparatus for performing reduction or enlargement-magnification processing of multi-value image data by linear interpolation, and outputting the multi-value image data, said linear interpolation including processing for obtaining a value of density for a converted pixel based upon values of a plurality of non-converted pixels, comprising:

equal-magnification processing means for performing equal-magnification processing by the linear interpolation by overlapping a converted pixel over the position of a non-converted pixel; and reduction or enlargement-magnification processing means for performing reduction or enlargement-magnification processing by the linear interpolation by overlapping a first converted pixel to the midpoint position between the position of a first non-converted pixel and a non-converted pixel adjacent thereto.

2. The apparatus according to claim 1, wherein said reduction or enlargement-magnification processing means performs the reduction or enlargement-magnification processing while defining a distance between adjacent non-converted pixels of the linear interpolation as an integral power of 2.

3. The apparatus according to claim 1, wherein said reduction or enlargement-magnification processing means performs pixel density conversion by changing a degree of reduction of sync clocks for output image data.

4. The apparatus according to claim 1, wherein the equal-magnification processing and the reduction or enlargement-magnification processing use a predetermined fixed value as an initial value of a positional relationship between pixels before and after conversion.

5. The apparatus according to claim 1, wherein the equal-magnification processing and the reduction or enlargement-magnification processing use a variable based on an equal magnification or a variable magnification upon execution of the equal-magnification and the reduction or enlargement-magnification as an initial value of a positional relationship between pixels before and after conversion.

6. A pixel density conversion method for performing reduction or enlargement-magnification processing of multi-value image data by linear interpolation, and outputting the multi-value image data, said linear interpolation including processing for obtaining a value of density for a converted pixel based upon values of a plurality of non-converted pixels, comprising the steps of:

performing equal magnification processing by the linear interpolation by overlapping a converted pixel over the position of a non-converted pixel; and performing reduction or enlargement-magnification processing by the linear interpolation by overlapping a first converted pixel to the midpoint position between the position of a first non-converted pixel and a non-converted pixel adjacent thereto.

* * * * *